Dec. 17, 1968  R. S. HOPKINS  3,416,353
HOOD AND DECK TOOL TO ASSIST IN THE REPAIR OF
AUTOMOBILE HOODS AND DECK LIDS
Filed Nov. 8, 1965  2 Sheets-Sheet 1

RICHARD S. HOPKINS
INVENTOR.

BY *[signature]*

ATTORNEY

Dec. 17, 1968 R. S. HOPKINS 3,416,353
HOOD AND DECK TOOL TO ASSIST IN THE REPAIR OF
AUTOMOBILE HOODS AND DECK LIDS
Filed Nov. 8, 1965 2 Sheets-Sheet 2
FIG. 5
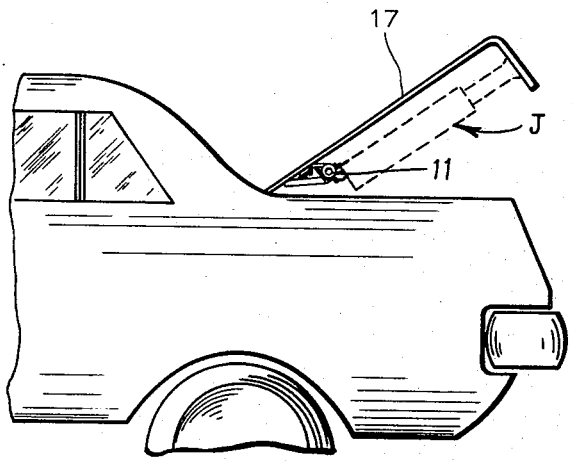
FIG. 6
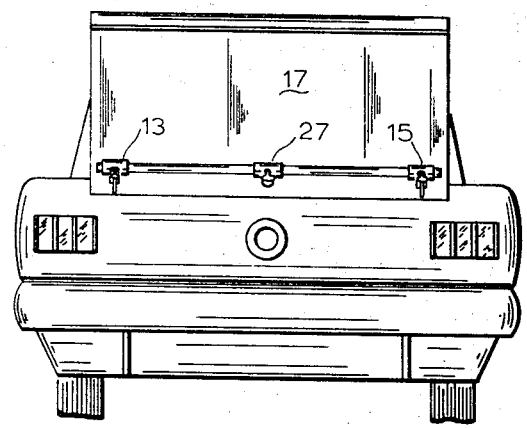
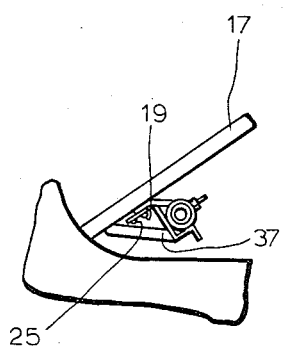
FIG. 7
RICHARD S. HOPKINS
INVENTOR.
BY George B. Auzerath
ATTORNEY

United States Patent Office

3,416,353
Patented Dec. 17, 1968

3,416,353
HOOD AND DECK TOOL TO ASSIST IN THE REPAIR OF AUTOMOBILE HOODS AND DECK LIDS
Richard S. Hopkins, 346 S. Broad St., Ridgewood, N.J. 07450
Filed Nov. 8, 1965, Ser. No. 506,663
2 Claims. (Cl. 72—446)

ABSTRACT OF THE DISCLOSURE

A tool adapted to serve as a rigid support for a body straightening jack in the form of an elongated bar having two adjustably mounted side brackets adjacent each end. Each bracket has a bifurcated portion adapted to be secured beneath one of the hinge bolts of a vehicle hood or trunk deck thereby rigidly securing the bar across the deck. A jack adapter rider is adjustably located on the bar and serves as a point of attachment for the jack.

---

The present invention relates to an automobile body tool and more particularly to a tool for the repair of automobile hoods and deck lids.

On today's crowded highways the chain reaction type of accident accounts for an increasingly large amount of collision damage. As a result damage often occurs to hoods or deck lids or both. On any estimate sheet the cost of a hood or deck lid is among the most expensive items encountered. The body man's decision to repair or replace these items depends upon his capability to solve the repair problem. He must restore the deck or hood framing to its original dimensions and contours. Then, he must repair the outer sheet metal by conventional methods.

The present invention relates to a tool which can be used to restore the deck or hood framing to its original dimensions and contours and materially assist in repairing the sheet metal by conventional methods.

The invention as well as other objects and advantages thereof will be more readily apparent from the following description taken together with the accompanying drawing, in which:

FIGURE 5 is an end view of the tool mounted on an automobile to straighten the rear deck lid;

FIGURE 6 is a view of the tool in place from the rear of the automobile; and,

FIGURE 7 is an enlarged view of the tool mounted on the automobile in the same view as FIGURE 5.

Figure 1:
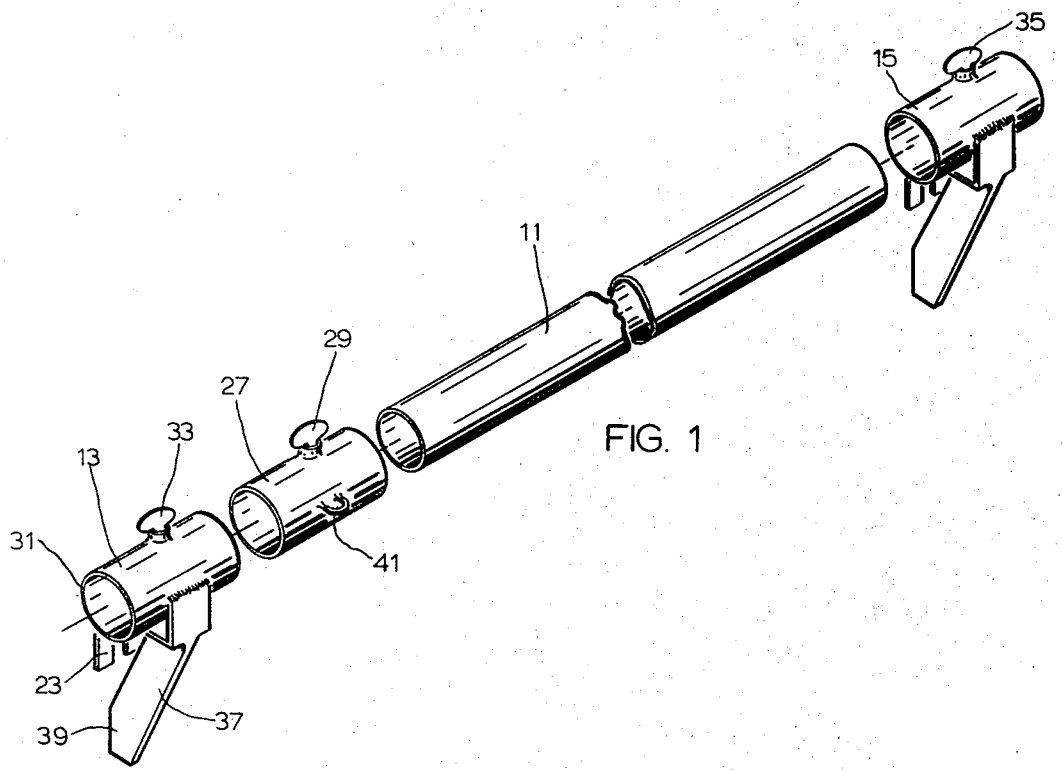
FIGURE 1 is a longitudinal perspective view of the tool contemplated herein.
Figure 2:
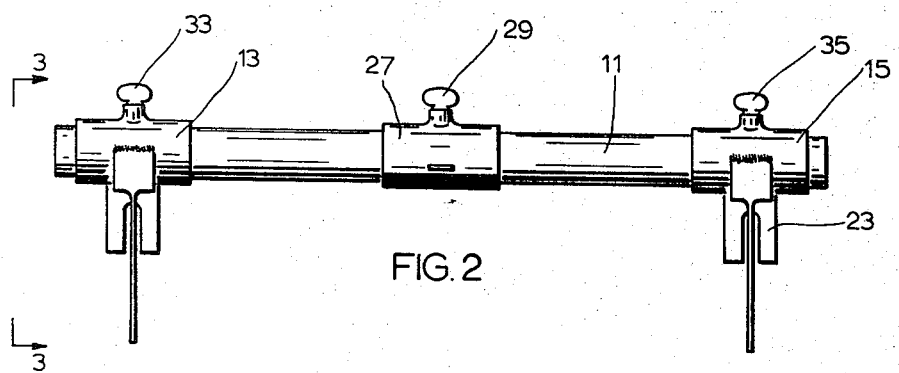
FIGURE 2 is a longitudinal view of the tool shown in FIGURE 1.
Figure 3:
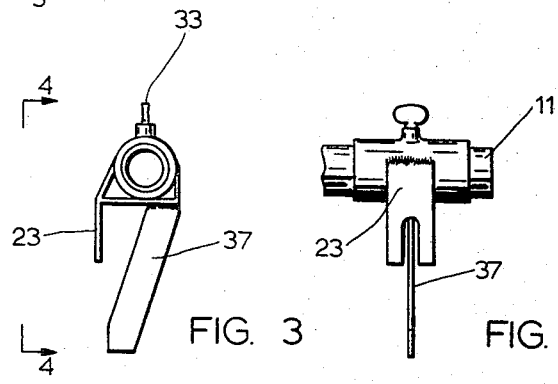
FIGURE 3 is an end view of the tool shown in FIGURE 2 along the lines 3—3 thereof.
Figure 4:
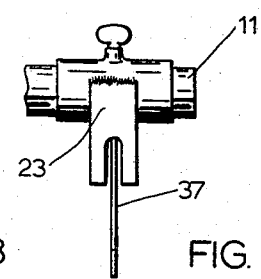
FIGURE 4 is a portion of the tool shown along the lines 4—4 of FIGURE 3; i.e., the opposite side of view shown in FIGURE 2.

It is well known that automobile hood and deck lids are composed of an inner and outer sheet of metal, the outer sheet of which is relatively smooth in contours, the inner sheet being formed and channeled in such a manner as to give strength and rigidity. Both sheets are formed to lay closely together and are joined at the perimeter by welding the overlapping flanges of each sheet. The common damage encountered in hoods and decks results from the chain reaction type of accident in which the front of hoods or the rear of decks are forced out of alignment. The straightening of such panels requires the straightening of both the inner and outer sheets of metals. The present invention contemplates a foothold device which fastens to the inner deck construction (or hood), at the deck hinges. Use is made of the mounting bolts which bolt the deck (or hood) to the vehicle. Thus, two brackets are used, one of each being mounted at each deck hinge. A bar spans the space between the brackets. Upon this spanner bar is mounted a movable bar rider jack adapter. This bar rider allows jacking at various angles through universal coupling. The jacks used are of the two to four-ton type such as sold by Blackhawk, Hein Warner, or H. K. Porter. Jack tubing of sufficient length is used to reach the area of damage. In operation, the purpose of the tool is to provide a rigid base against which the jack reacts to impart a straightening force to the damaged portion of the hood or deck sheet metal. It is understood that the jack will apply such force to the downturned deck portion as shown in FIGURE 5 of the drawing.

Briefly stated, the present invention contemplates a tool for use with a jack to exert pressure on the hood and deck and comprises an elongated bar which has two side brackets which can be moved along the elongated bar and a rider which can also be moved along the bar.

In carrying the invention into practice, the components are shaped so as to be able to fasten the tool to the car. The tool, i.e., the hood and deck press bar 11 includes two side brackets 13 and 15 which are installed between the hood or deck and its hinges 19. On most installations this is accomplished by removing the upper bolt on each side and loosening the lower bolt sufficiently to slip the brackets grip means notch 23 between the hood or deck 17 and its hinges 19. The bracket 13 is then moved into line with the hinge 19 and the upper bolt 25 replaced and both bolts fastened securely.

Mounted on the press bar is a bar rider 27 which may be positioned at any point along the press bar 11 allowing jacking across the full width of the hood or deck. A wing bolt 29 on the bar rider 27 may be rotated to allow the rider 27 to be adjustably positioned. The bar rider should be securely locked in alignment using the wing bolt 29 provided before jack pressure is applied.

Therefore, when repairing a damaged hood or deck lid, the lid is opened and the hinge bolts are loosened. If necessary one of the bolts is removed, and later replaced. The side bracket notches 23 are inserted between the hinge and the deck. The bolts are then tightened against the bracket. Bar rider 27 can then be moved along the bar to the proper location and fastened by wing bolt 29. The bar 11 which is cylindrical is then placed through the bracket ring 31 and fastened to the bracket by wing units 33 and 35.

Particular attention must be given to the construction of bracket lever 37 located opposite the bracket notch. Bracket lever 37 includes a straight portion 39 designed to rest against the car deck for leverage. When the tool is mounted on the automobile a jack J can be attached to bar rider 27 by means of a ring 41 thereon. Thus to repair the hood or deck damage, it is necessary to slide the press bar through one of the mounting brackets. The bar rider is then slipped onto the press bar between the brackets and the bar is then passed through the opposite mounting bracket and the wing bolts on the mounting brackets are fastened securely. The press bar should be made of seamless hardwall tubing and is about 60 inches long.

It is to be observed therefore that the present invention provides for an automobile tool and comprises in combination, an elongated bar, a pair of side brackets for adjustable disposition towards each end of the bar, each having a grip means notch for fastening to the deck of an automobile body and a lever opposite the notch to engage the deck of a car, the lever and grip means being disposed at right angles to the bar; and, an adjustable centrally located bar rider including fastening means for fastening to another tool whereby, by fastening the pair of side brackets to the underside of an automobile with the bar properly adjusted, and exerting force on the bar rider, the smashed deck of an automobile can be restored to its shape. Preferably, the side brackets have rings, the bar passing through the rings and being held in place by a wing nut on the brackets for adjustments.

While it will be apparent that the embodiment of the invention herein disclosed is well calculated to fulfill the objects of the invention, it will be apperciated that the invention is susceptible to modification, variation and change without departing from the proper scope or fair meaning of the subjoined claims.

I claim:

1. An automobile tool, comprising in combination: an elongated bar; a pair of side brackets slidably engaging the bar for adjustable disposition towards each end of the bar, each bracket having grip means formed as a flat fork section with a notch for fastening to the deck of an automobile body by sliding the notch into corresponding bolts in said deck, and a lever integral with each bracket opposite the notch to engage the deck of a car, said lever and grip means extending from said brackets; and, an adjustable centrally located bar rider slidably engaging the bar, including fastening means for fastenening to another tool, whereby by fastening said pair of brackets to the underside of an automobile deck and exerting force on the bar rider, the smashed deck of an automobile can be restored to its shape.

2. A tool as claimed in claim 1, said side brackets and bar rider having an aperture so that the bar can slide therethrough, and wing nuts thereon for holding the bar.

References Cited

UNITED STATES PATENTS 2,858,872 11/1958 Hougen ---------- 72—705 X
2,797,725 7/1957 Whitesell -------- 72—705 X CHARLES W. LANHAM, *Primary Examiner.*

E. SUTTON, *Assistant Examiner.*

U.S. Cl. X.R.

72—705